Oct. 13, 1925.

P. ROBLE

1,557,334

MOTION PICTURE PROJECTING MACHINE

Filed Oct. 18, 1924  6 Sheets-Sheet 1

INVENTOR
Pedro Roble
BY
ATTORNEYS

Oct. 13, 1925.  
P. ROBLE  
1,557,334  
MOTION PICTURE PROJECTING MACHINE  
Filed Oct. 18, 1924  
6 Sheets-Sheet 3

WITNESSES

INVENTOR  
*Pedro Roble*  
BY  
ATTORNEYS

Oct. 13, 1925.

P. ROBLE

MOTION PICTURE PROJECTING MACHINE

Filed Oct. 18, 1924     6 Sheets-Sheet 4

1,557,334

WITNESSES

INVENTOR
Pedro Roble
BY
ATTORNEYS

Patented Oct. 13, 1925.

1,557,334

UNITED STATES PATENT OFFICE.

PEDRO ROBLE, OF NEW YORK, N. Y., ASSIGNOR OF TWENTY-FIVE PER CENT TO JOAQUIN MONTOYA, OF NEW YORK, N. Y.

MOTION-PICTURE-PROJECTING MACHINE.

Application filed October 18, 1924. Serial No. 744,414.

*To all whom it may concern:*

Be it known that I, PEDRO ROBLE, a citizen of Colombia, and a resident of the city of New York, borough of Manhattan, in the county and State of New York, have invented a new and Improved Motion-Picture-Projecting Machine, of which the following is a full, clear, and exact description.

This invention relates to motion picture projecting machines, an object of the invention being to provide an improved mechanism co-operating with the film whereby great lengths of film are saved in the projection of the titles.

With films such as ordinarily made for use with the ordinary type of projecting machine it is necessary to provide quite a length of film for each title, the length of film employed being determined by the length of the title and the time it should be exposed so that it can be easily read.

It is the purpose of my invention to provide improved means whereby the film is stopped for a predetermined length of time so that the title can be easily read, hence resulting in a great saving of film.

My invention is especially adapted for use in connection with a film devoid of a perforate edge, such as in common use and which is fed or moved positively and intermittently by my improved mechanism.

In a copending application filed by me on August 7, 1924, Serial No. 730,664, for a film handling mechanism for motion picture projecting machines, I have disclosed improved means for insuring a proper movement of the film, and it is to be understood that this means will be employed in connection with the construction disclosed in the present case and is omitted in the drawings and description for the purpose of clearness.

A further object is to provide pneumatic means which causes the film to remain stationary for the desired length of time to expose the title.

With these and other objects in view, the invention consists in certain novel features of construction and combinations and arrangements of parts which will be more fully hereinafter described and pointed out in the claims.

In the accompanying drawings—

In the several figures of the drawings, I have omitted for clearness all unnecessary construction. With this idea in view I have illustrated but three rolls 1, 2, 3, over which the film 4 is fed but it is, of course, to be understood that other mechanism is employed, such, for example, as illustrated in my copending application above referred to for insuring positive movement of the film. It will be noted that the film 4 is without the side perforations with which the ordinary films are provided and, hence, my improved film may be made appreciably narrower than the ordinary film and great saving in cost will result.

5 represents a plate having an opening 6 therein through which the film is exposed, and it is, of course, to be understood that a suitable light (not shown) is necessary to project the rays through the film as is customary.

7 represents a drive shaft having a gear wheel 8 thereon meshing with a pinion 9 on a countershaft 10. This countershaft 10 carries a crank disk 11 in which a radially movable dovetailed bar 12 is mounted and extends across the center of the disk and is held in normal position by a cushioning spring 13.

This bar 12 carries a crank pin 14 with which a pitman 15 is connected, and the cushioning spring 13 functions to allow a certain amount of movement of the bar 12 and crank pin radially of the disk 11 in order that the pitman 15, which has an excess of travel, may pass or go over the dead center after the tooth 42 stops against part 38, to be hereinafter described. Thus, the excess of travel of pitman 15 is taken up by spring 13, making a perfect contact between tooth 42 and stop 38, as a result of which the spaces of film 4 are always absolutely equal regardless of any wear in the mechanism after considerable use. The pitman 15 is connected to crank arms 17 on a rocker frame 16.

This rocker frame is mounted loosely on the reduced end of a shaft 18 and is provided with a pair of crank arms 19 and 20 located at an angle to the crank arms 17. These arms 19 and 20 support a pin 21 which has movement therethrough, and a coil spring 22 is located around the pin, bearing at one end against a shoulder 23 on the pin and at its other end against the arm 19, normally holding the pin in its projected position.

This pin 21 is adapted to project into any of a circular series of slots or openings 24 in a wheel 25 fixed to shaft 18. The slots 24 are arcuate in form and are of proper length so that the movement of the rocker frame imparts a quarter turn to the wheel 25 at each complete operation.

In order that the pin may be released from engagement with the wheel 25 it is necessary to withdraw the same longitudinally against the action of the spring 22. This withdrawal of the pin 21 is accomplished by a reciprocating rod as illustrated most clearly in Figures 1 and 5. This rod 26 has a collar 27 secured thereon, and a coil spring 28 is located on the rod between the collar and a fixed member 29 so as to normally project the rod in one direction.

Figure 5:
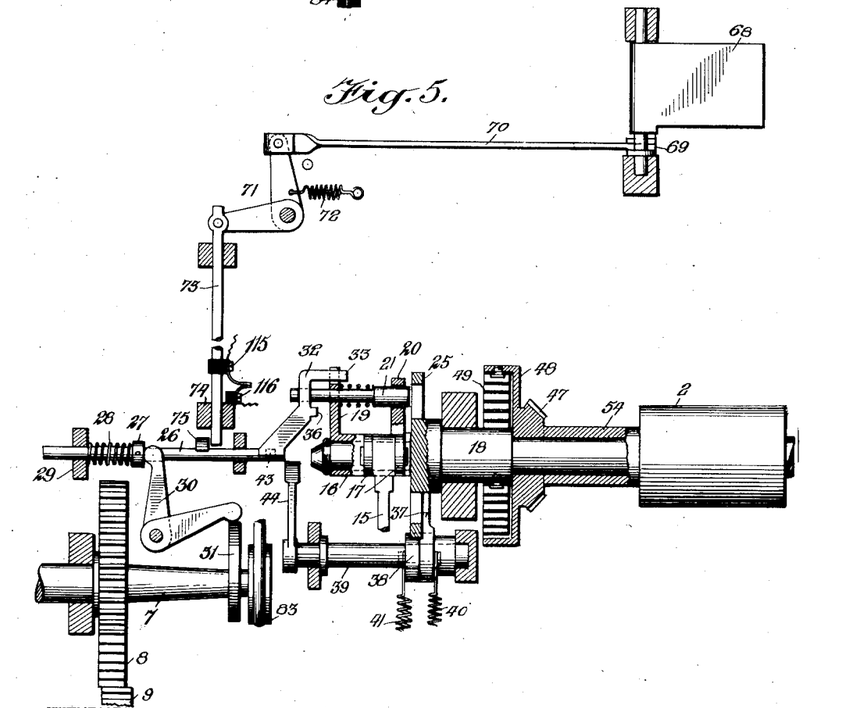
Figure 5 is a view, partly in front elevation and partly in vertical section, illustrating parts shown in Figure 2 in the same position as that illustrated in Figure 1.
Figures 6, 7:
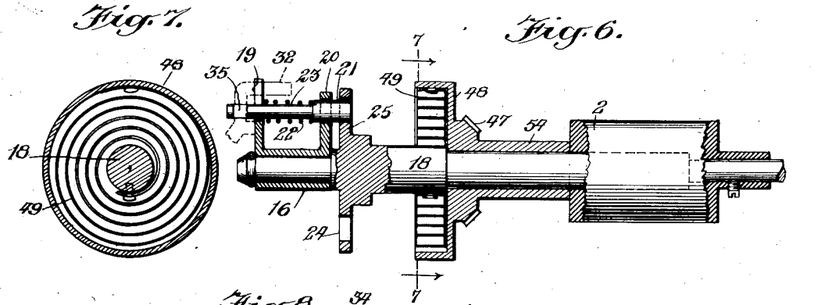
Figure 6 is a partial elevational and partial sectional view of the motivating means and tensioning spring.
Figure 7 is a view in section on the line 7—7 of Figure 6.
Figure 8:
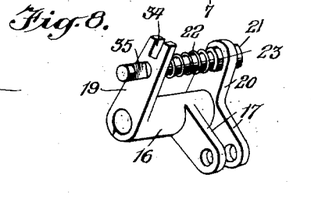
Figure 8 is a perspective view of the rocker frame 16.

A bell crank lever 30 has one of its arms in engagement with the collar 27 and the other arm in engagement with a cam 31 on drive shaft 7, so that, as this drive shaft is continuously turning, the cam and bell crank lever will cause the rod 26 to move to the left in Figure 5, and, when permitted, the spring 28 will cause the rod to move to the right.

This rod 26 has a bracket 32 fixed thereon and a finger 33 on the bracket 32 engages in the bifurcated upper end 34 of the upper arm 19 so that the rod 26 is caused to rock with the rocker frame 16. A short finger 36 is formed on the bracket 32 and engages the arm 19 so as to limit the movement of the bracket of the rod 26 in one direction. It will thus be noted that the rod 26 and the bracket 32 fixed thereon are coupled to the rocker frame 16 in such a manner that they rock with said frame but at the end of each second complete movement of the rocker frame a longitudinal movement is imparted to the rod 26 and the bracket 32 to draw the pin 21 out of engagement with the wheel 25. In other words, the function of the rod 26 and the bracket 32 is to withdraw the pin 21 from the wheel 25 every second revolution of disk 11 in order that wheel 25 be moved only once each two revolutions of the disk 11. Therefore, the time of rest of wheel 25 is three times longer than the time it moves.

Figures 9, 10, 11:
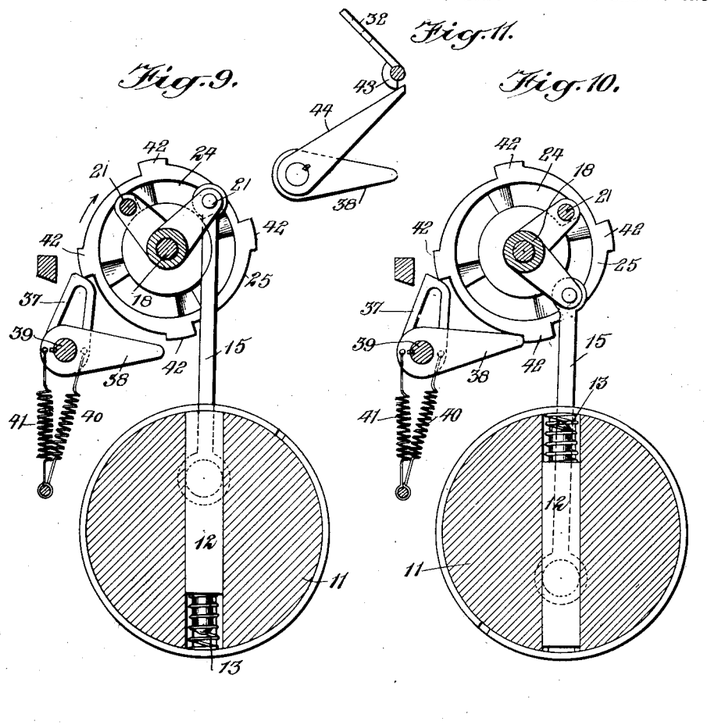
Figure 9 is an enlarged view in section on the line 9—9 of Figure 1.
Figure 10 is a view similar to Figure 9, showing the parts in a different position.
Figure 11 is an enlarged detail view in section illustrating the parts in position when the escapement arm is released from the wheel 25.
Figure 12:
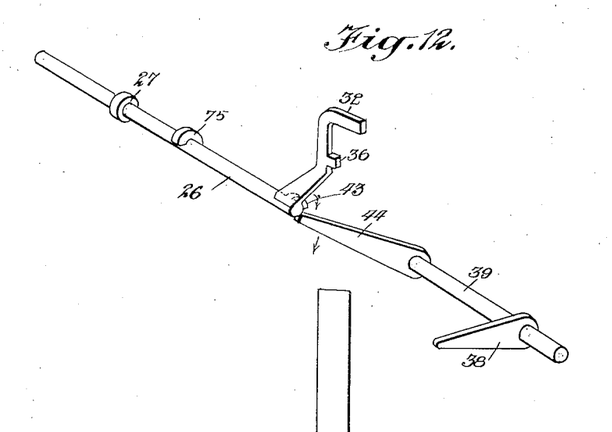
Figure 12 is a perspective view illustrating a detail construction.

In order to prevent any possibility of movement of the wheel 25 beyond its intermittent rotary action, I provide an improved escapement mechanism, illustrated in detail in Figures 9, 10 and 11. A pair of escapement arms 37 and 38 are mounted on a shaft 39, the arm 37 being loose on the shaft and the arm 38 keyed thereto. A pair of coil springs 40 and 41 engage the arms 37 and 38, respectively, the tendency of the spring 40 being to move the arm 37 against the periphery of wheel 25 and the tendency of the spring 41 being to move the end of arm 38 against the periphery of the wheel 25.

This wheel 25 is formed on its periphery with four teeth 42, spaced apart an equal distance for engagement with the arms 37 and 38. The wheel 25 is moved in the direction of the arrow in a step by step operation and is caused to move a quarter turn at one complete revolution of the crank disk 11 through the medium of the rocker frame 16 above referred to. At the beginning and during the movement of the wheel the arms 37 and 38 are in the position shown in Figure 9. When the wheel reaches the end of its forward stroke the arm 38 is permitted to move in the path of one of the teeth 42 and prevent overmovement.

This movement of the arm 38 by the action of the spring 41 is permitted by the movement of a lug 43 on the rod 26 which at the proper time is moved away from a crank arm 44 on said shaft 39 to permit the spring 41 to impart a turning movement to the shaft 39 sufficient to bring the free end of the arm 38 against one of the teeth 42, as indicated in Figure 10.

As soon as the rocker frame 16 begins its forward movement the shaft 39 is turned by the engagement of lug 43 with the arm 44 to turn the arm 38 against the action of spring 41 and release the arm 38 from the tooth 42 of wheel 25. In other words the lug 43 is so positioned relative to the arm 44 that throughout the normal movement of wheel 25 it holds the arm 38 out of the path of the tooth 42, but as soon as the end of the stroke is reached it permits the arm 38 to be moved into the path of the tooth 42 by the action of its spring 41.

On the shaft 18, which is intermittently moved by the wheel 25, I provide a bevel gear wheel 47 which is loosely mounted on the shaft and which carries a large cylindrical hub 48 within which a spiral spring 49 is housed. The inner end of this spring is fixed to the shaft 18 and the outer end of the spring is fixed to the hub so that motion is imparted from the shaft to the gear wheel through the medium of the spring, the latter being wound under tension for a predetermined degree before motion is transmitted to the bevel gear wheel 47, and this tension is maintained until released by the action of the spring, as will more fully hereinafter appear.

The bevel gear wheel 47 meshes with a pair of bevel pinions 50 and 51 on shafts 52 and 53, respectively. The gear wheel 47 is fixed to the bearing sleeve 54 and the feed roll 2 is fixed to the shaft 18. The shaft 52 is connected by intermeshing bevel gers 55 and 56 with the shaft 57 carrying the roll 3. The shaft 53 is connected by bevel gears 58 and 59 with the shaft 60 carrying feed roll 1.

The film 4 above referred to is provided at suitable points with one or more title spaces 61 and adjacent the title spaces 61 the film is made with longitudinal slots 62. I preferably arrange the titles and slots in pairs, or possibly in greater duplication, in order that the film may be repaired should it break at a point adjacent or on one of the titles without effecting the operation.

Figures 1, 15, 16:
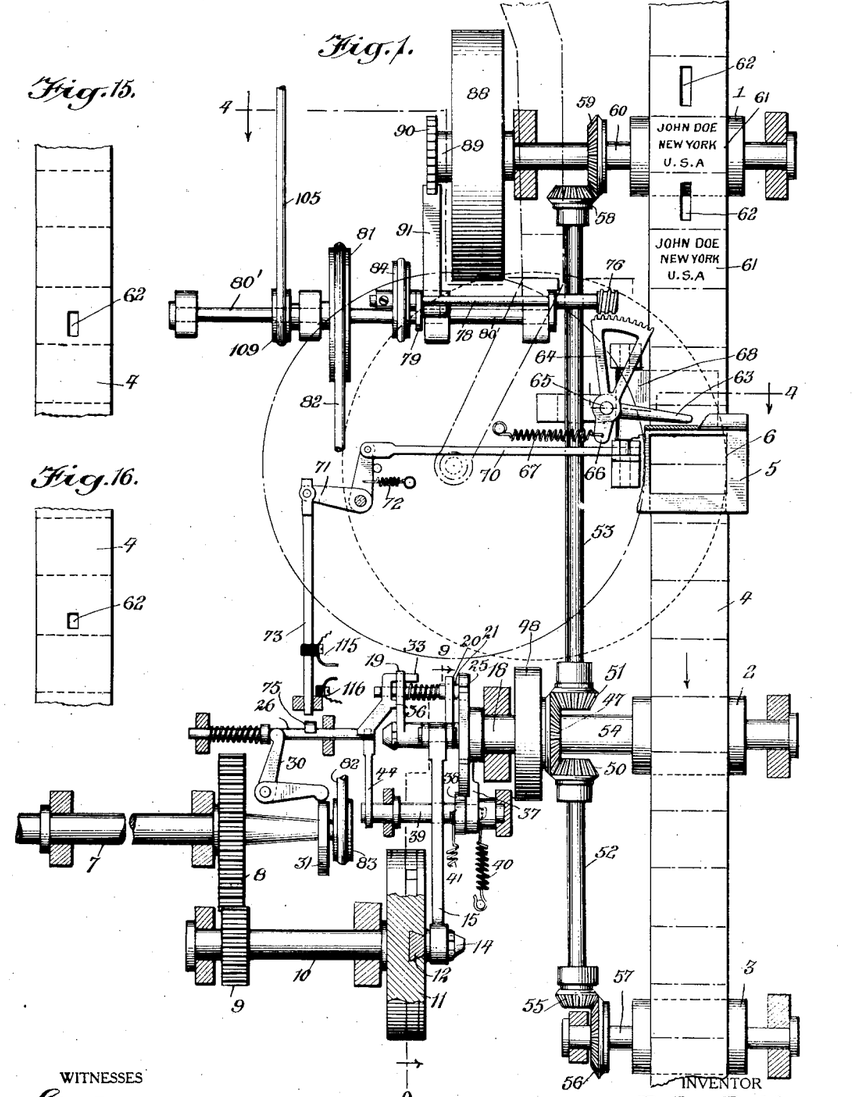
Fig. 1 is a view mainly in front elevation but partly in section, illustrating my improved machine.
Figures 15, 16 are fragmentary views showing portions of the film to illustrate the different lengths of slot by means of which the time of holding the film stationary is controlled.

It is also to be understood that the film will have slots 62 of a length corresponding to the time of exposure of the title. In other words, if the title is short a relatively short slot 62 will be provided, as indicated in Figure 16, or a longer slot 62 will be provided if the title is longer, as illustrated in Figure 15.

To bring the film to a standstill while the title is being shown, I provide pneumatic means. For example, a pneumatic nozzle 63 is fixed to a segment 64 pivotally mounted as shown at 65 and having a finger 66 thereon to which a coil spring 67 is connected for maintaining the parts in normal position.

Figure 4:
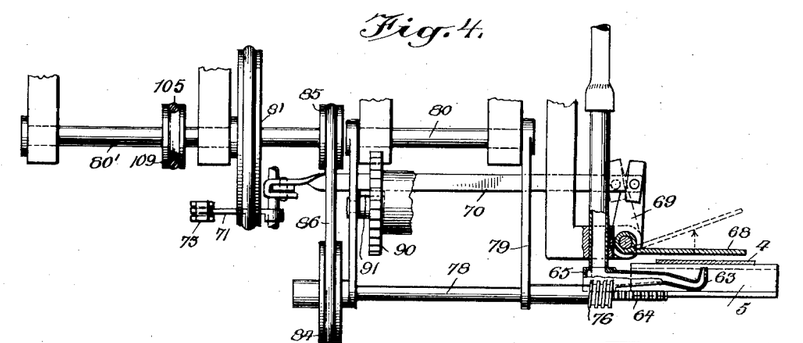
Figure 4 is a view in horizontal secton on the line 4—4 of Figure 1.

The nozzle 63 discharges its air against the face of the film and when one of the slots 62 reaches the discharge end of the nozzle it allows the air to be blown through the film against a pivoted shutter 68 causing the latter to move rearwardly. This shutter is illustrated clearly in Figure 4, and it will be noted that the shutter 68 has a crank arm 69 fixed to its pivoted end and connected by a link 70 with a bell crank lever 71. A coil spring 72 is connected to one end of the lever 71 to return the shutter to normal position and hold it in such position.

The bell crank lever connects the link 70 with a rod 73, and this rod 73 is movable through a guide 74 and is adapted at its free end to be projected into the path of a lug 75 on rod 26 and prevent the forward movement of the rod. As above explained, the function of the rod and its co-operating parts is to withdraw the pin 21 from engagement with the wheel 25, and the lug 75 is so positioned that when the shutter 68 is moved by the blast of air the rod 73 will be projected into the path of movement of the lug 75 and hold the pin 21 in its withdrawn position so that the crank disk 11 may turn the rocker frame 16 without imparting motion to the wheel 25. Thus the film will remain stationary until such time as the shutter returns to its normal position.

To bring about this return movement of the shutter and also to cause the free end of the nozzle 63 to move longitudinally of the slot 62 in the film 4, the segment 64 constitutes a toothed segment and is adapted to be engaged by a worm 76 fixed to a shaft 78 and mounted on a cradle 79.

The cradle 79 at its pivotally mounted end supports a shaft 80, and a pulley 81 on a shaft 80' is connected by a belt 82 with a pulley 83 on the drive shaft 7. The shafts 78 and 80 have pulleys 84 and 85 fixed thereon and connected by a belt 86 so that motion is continuously imparted to the worm although the worm is normally out of engagement with the segment 64 and held out of such engagement by a coil spring 87 to connect the cradle 79 with the fixed part of the frame.

A relatively heavy fly wheel 88 is fixed to the shaft 60 and carries on its hub 89 a ratchet wheel 90. This ratchet wheel 90 when turning in its normal direction rides freely over the free end of a link 91 which is pivotally connected to the cradle 79, as shown at 92, and a flat spring 93 exerts pressure on the link to hold it in normal engagement with the ratchet wheel.

When the slot 62 registers with the end of the nozzle 63 and the shutter 68 is moved by the blast of air and the rod 73 is projected into the path of the lug 75, to stop the driving mechanism, the spring 49 having energy stored therein after the inertia is overcome will cause the gear 47 and the mechanism to which it imparts motion to turn in the reverse direction. This reverse direction of movement is very slight but it is sufficient to cause the ratchet wheel 90 to exert a longitudinal pressure against the link 91 to move the cradle 79 and to position the worm 76 in mesh with the segment 64. Hence the segment immediately begins to move and the free end of the nozzle 63 begins to travel along the length of the slot 62. When it reaches the end of the slot 62 and passes onto and over the face of the film the air pressure on the shutter 68 is released and the spring 72 returns the shutter 68 to normal position and in doing so releases the rod 26 and the normal operation of feeding the film begins so that the cradle is released and the worm 76 moves away from the segment 64. The spring 67 then returns the nozzle 63 to its normal position and the operation will be again repeated when the slot reaches the end of the nozzle.

As the roll is fixed to shaft 18 this roll will receive motion as soon as the wheel 25 is moved and will quickly draw the film sections containing slots past the exposure opening before motion is transmitted to the other operating mechanism. This is due to the fact that it will take a short time for the shaft 18 to wind the spring 49 sufficiently to cause the gear 47 and connected parts to move.

Figure 2:
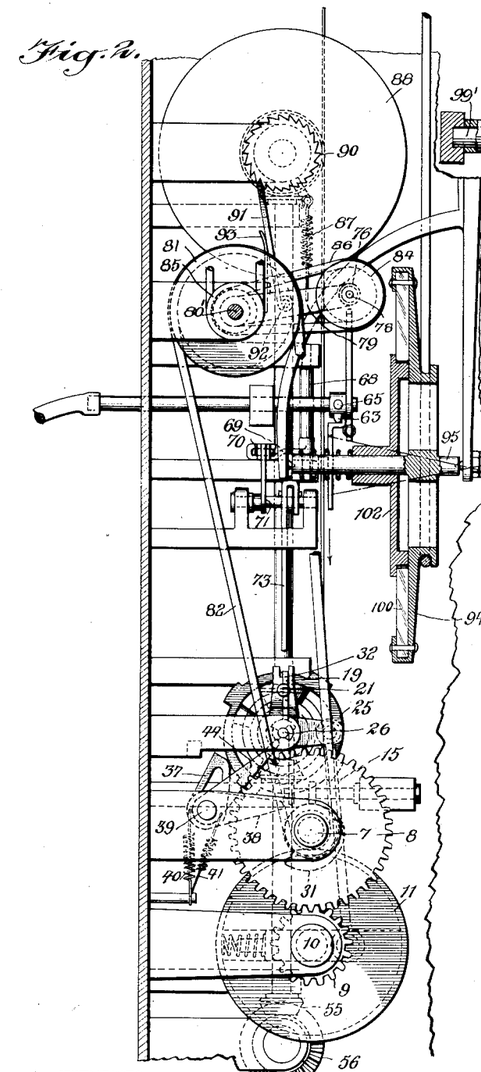
Figure 2 is a view in elevation at right angles to Figure 1 with certain parts broken away for clearness; this Figure 2 also illustrates in longitudinal section my improved protector which moves between the film and the light to prevent injury to the film when at a standstill.
Figure 3:
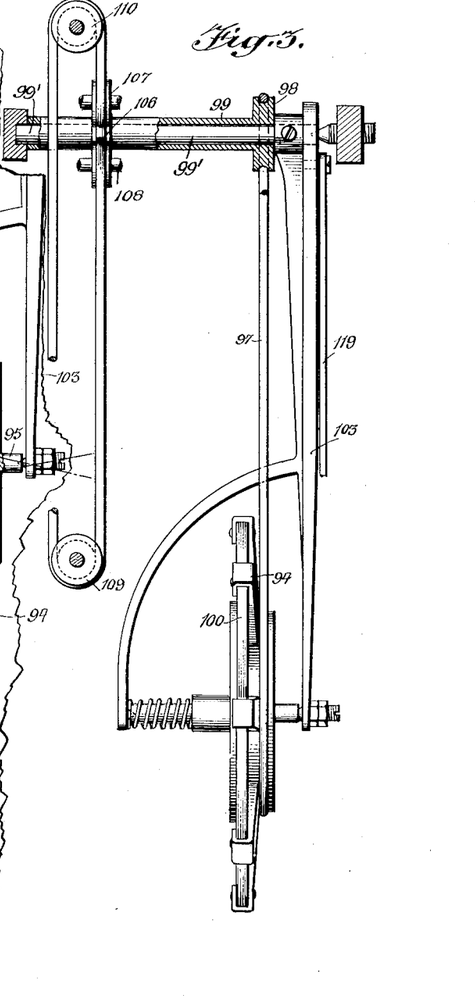
Figure 3 is a detail view in elevation at right angles to Figure 2, showing the protector and its operating mechanism.
Figure 14:
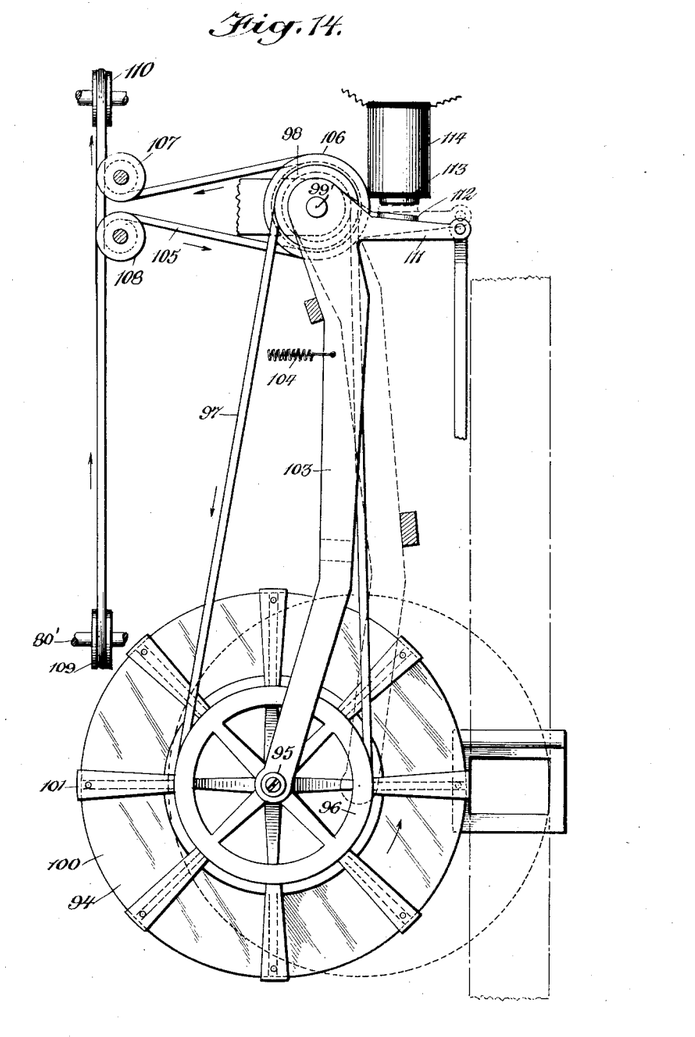
Figure 14 is an enlarged view in front elevation illustrating my improved film protector.

In order to protect the film from the heat of the light while it is stationary, I provide an improved protecting device 94, as illustrated most clearly in Figures 2, 3 and 14, and I have also illustrated by dot and dash lines in Figure 1 the two positions this protector takes in operation. The protector itself as above stated is located between the film and the lamp comprises a circular member fixed to a shaft 95 and carrying a pulley 96 which is continuously driven by a belt 97 from a pulley 98 on a rotary sleeve 99. The protector comprises a circular series of transparent sections 100 which may be removably supported in arms 101 and clamped in position by the spring-pressed disk 102 so that the transparent plates may be removed and replaced from time to time.

The shaft 95 is carried by a rocker arm 103 fixed to a rocker shaft 99′ on which the sleeve 99 freely turns and held in normal position by a spring 104. Motion is transmitted to the sleeve 99 by a belt 105 which passes around a pulley 106 on the sleeve 99, around idlers 107 and 108, respectively, and also around a pulley 109 on shaft 80′. The belt 105 also passes around a pulley 110 so that motion is transmitted from the shaft 80′ to the sleeve 99 through the medium of said belt 105.

A crank arm 111 is fixed to the arm 103 adjacent the pivotal point and carries an armature 112 which is normally spaced from the core 113 of an electromagnet 114 so that when the electromagnet 114 is energized it functions to swing the protector into position between the lamp and the film, as indicated by dotted lines in Figure 14.

To cause this movement automatically, the electromagnet 114 is included in circuit with a pair of contacts 115 and 116. One of these contacts is carried by the rod 73 and the other secured to the fixed guide 74 so that when the rod 73 moves to a position to stop the film these contacts are brought together to close the circuit to the electromagnet 114 and the latter is energized to swing the protector into position.

It is desirable that while the film is stationary the reel on which the film is wound be checked or stopped in order to prevent it from taking up the ordinary slack which is desirable in the lower run of the film. With this end in view I provide a bell crank lever 117 which constitutes a catch and is provided with a finger 118 adapted to move into one of the openings ordinarily found in the side wall of the reel 120. This construction is illustrated more or less diagrammatically in Figure 13. The bell crank lever 117 is connected by a link 119 with the arm 111 so that as this arm is moved by the electromagnet the reel will be stopped and when the circuit to the electromagnet is broken by the starting of the film moving mechanism the catch will be released, as will be readily understood.

Figure 13:
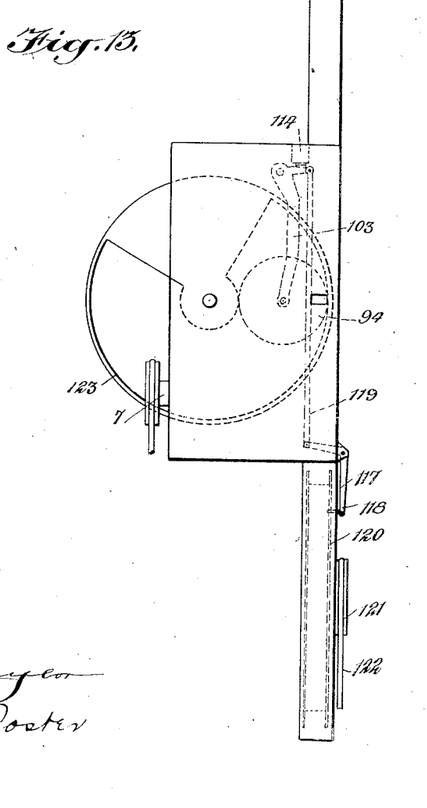
Figure 13 is a view in front elevation somewhat diagrammatically illustrating the reel checking mechanism and other mechanism co-operating therewith.

In Figure 13 I show the reel as having a pulley 121 with a belt 122 for driving the same, and I also illustrate in this view a proper form of shutter 123 with which the machine will be equipped.

While I have shown in detail the operation of the machine I shall now describe in general terms the operation which is as follows:

A step by step motion is imparted to the feed roll 2 through the medium of the mechanism above described so that the film is fed step by step to bring the pictures into proper framing position with the opening 6 of plate 5. During this movement energy is stored in the spring 49. When the slot 62 registers with the discharge end of the air nozzle 63, the shutter 68 is moved by the blast of air to cause the rod 73 to move into the path of lug 75 and hold the pin 21 out of coupled engagement with the wheel 25. The forward feeding motion of the film will then be stopped. When this takes place the contacts 115 and 116 are brought together to close the circuit to the electromagnet 114 and this electromagnet functions to move the rotary protector 94 into position between the film and the lamp. At the same time the electromagnet stops the movement of the reel 120 through the medium of the catch 118. As soon as the driving mechanism is uncoupled from the wheel 25 and the inertia of the spring overcome, the energy stored in the spring 49 will cause the shaft 60 and the ratchet wheel 90 to turn in the opposite direction from that in which it normally turns, and this ratchet wheel will force the link 91 and the cradle 79 in a direction to bring the worm 76 into mesh with segment 64. This will cause the nozzle to move along the slot 62 of the film until it reaches the end of the slot when the shutter 68 will be returned to normal position by the spring 72. At the same time this spring 72 will withdraw the rod 73 so that the driving mechanism will be coupled to the wheel 25. As above explained, the roll 2 will operate for a sufficient length of time after the wheel 25 begins to move before the other mechanism resumes its normal operation because of the fact that the shaft 18 is fixedly connected to the wheel 25. This movement of the roll 2 will quickly draw the succeeding slotted sections of film past the exposure opening so that there will be no repetition of the title. The only reason for providing these repetitions of titles and slotted sections is in order to permit repair if the film should break, and this movement of the roll 2 in advance of the movement of the other mechanism is sufficient to cause these additional slotted sections to pass the exposure opening without stopping the operation of the film. As soon as this takes place, the pressure on the link 91 by ratchet wheel 90 will be released and the spring 87 will move the cradle 79 so as to move the worm 76 out of mesh with segment 64. The spring 67 will then turn the nozzle to normal position. As the length of time the film is held stationary is controlled by the length of time the shutter 68 is held by the pressure of air it is simply necessary to vary the length of the slots in the film in order to properly time this holding or stationary position of the film in accordance with the length of the title to be read.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A motion picture projecting machine, comprising film moving means, a film having slots therein, an air nozzle discharging against the film and through the slots, means back of the slots operated by the blast of air to stop the film moving means, and means for moving the nozzle throughout the length of the slots.

2. A motion picture projecting machine, including film moving means, a movable member for stopping the film moving means, an air nozzle, a film serving as a shield for the member and having slots therein through which the air from the nozzle passes to operate the member, and automatic means for moving the nozzle throughout the length of the slots.

3. A motion picture projecting machine, including film moving means, a movable member for stopping the film moving means, an air nozzle, a film serving as a shield for the member and having slots therein through which the air from the nozzle passes to operate the member, a toothed segment fixed to the nozzle, a worm normally out of mesh with the segment, and automatic means for moving the worm into mesh with the segment when a slot is in register with the discharge end of the nozzle.

4. A motion picture projecting machine, comprising film moving means, a film having slots therein, an air nozzle discharging against the film and through the slots, means back of the slots operated by the blast of air to stop the film moving means, means for moving the nozzle throughout the length of the slots, a transparent film protector, and means for moving the protector across the film while the latter is stationary.

5. A motion picture projecting machine, including film moving means, a movable member for stopping the film moving means, an air nozzle, a film serving as a shield for the member and having slots therein through which the air from the nozzle passes to operate the member, a transparent film protector, and means for moving the protector across the film while the latter is stationary.

6. A motion picture projecting machine, including film moving means, a movable member for stopping the film moving means, an air nozzle, a film serving as a shield for the member and having slots therein through which the air from the nozzle passes to operate the member, automatic means for moving the nozzle throughout the length of the slots, a transparent film protector, and means for moving the protector across the film while the latter is stationary.

7. A motion picture projecting machine, including film moving means, a movable member for stopping the film moving means, an air nozzle, a film serving as a shield for the member and having slots therein through which the air from the nozzle passes to operate the member, a toothed segment fixed to the nozzle, a worm normally out of mesh with the segment, automatic means for moving the worm into mesh with the segment when a slot is in register with the discharge end of the nozzle, a transparent film protector, and means for moving the protector across the film while the latter is stationary.

8. A motion picture projecting machine, comprising film moving means, a film having slots therein, an air nozzle discharging against the film and through the slots, means back of the slots operated by the blast of air to stop the film moving means, means for moving the nozzle throughout the length of the slots, a pivoted arm, an electromagnet controlling the movement of the arm, a rotary transparent protector carried by the arm, and circuit closing means for the electromagnet operated by the film stopping means to cause the protector to move to a position over the film.

9. A motion picture projecting machine, including film moving means, a movable member for stopping the film moving means, an air nozzle, a film serving as a shield for the member and having slots therein through which the air from the nozzle passes to operate the member, a pivoted arm, an electromagnet controlling the movement of the arm, a rotary transparent protector carried by the arm, and circuit closing means for the electromagnet operated by the film stopping means to cause the protector to move to a position over the film.

10. A motion picture projecting machine, including film moving means, a movable member for stopping the film moving means, an air nozzle, a film serving as a shield for the member and having slots therein through which the air from the nozzle passes to operate the member, automatic means for moving the nozzle throughout the length of the slots, a pivoted arm, an electromagnet controlling the movement of the arm, a rotary transparent protector carried by the arm, and circuit closing means for the electromagnet operated by the film stopping means to cause the protector to move to a position over the film.

11. A motion picture projecting machine, including film moving means, a movable member for stopping the film moving means, an air nozzle, a film serving as a shield for the member and having slots therein through which the air from the nozzle passed to operate the member, a toothed segment fixed to the nozzle, a worm normally out of mesh with the segment, automatic means for moving the worm into mesh with the segment when a slot is in register with the discharge end of the nozzle, a pivoted arm, an electromagnet controlling the movement of the arm, a rotary transparent protector carried by the arm, and circuit closing means for the electromagnet operated by the film stopping means to cause the protector to move to a position over the film.

PEDRO ROBLE.